United States Patent [19]
Fukino

[11] Patent Number: 5,708,872
[45] Date of Patent: Jan. 13, 1998

[54] LENS BARREL WITH BUILT-IN ULTRASONIC MOTOR, CAMERA HAVING LENS BARREL AND METHOD

[75] Inventor: Kunihiro Fukino, Kanagawa-ken, Japan

[73] Assignee: Nikon Corporation, Tokyo, Japan

[21] Appl. No.: 539,434

[22] Filed: Oct. 5, 1995

[30] Foreign Application Priority Data

Oct. 14, 1994 [JP] Japan .................. 6-249224

[51] Int. Cl.$^6$ .............................. G03B 3/10; G02B 15/14
[52] U.S. Cl. .................. 396/133; 396/137; 359/696; 359/698
[58] Field of Search .................. 354/195.1, 195.12, 354/400; 359/696, 697, 698; 396/137, 133

[56] References Cited

U.S. PATENT DOCUMENTS

| | | | |
|---|---|---|---|
| 4,796,045 | 1/1989 | Hamanishi et al. | 354/400 |
| 4,893,145 | 1/1990 | Matsuda | 354/400 |
| 4,925,282 | 5/1990 | Kanno et al. | 350/429 |
| 5,198,935 | 3/1993 | Imanari et al. | 359/698 |
| 5,448,328 | 9/1995 | Suzuki et al. | 354/400 |
| 5,546,233 | 8/1996 | Imanari et al. | 359/696 |
| 5,561,564 | 10/1996 | Nakamura et al. | 359/285 |

FOREIGN PATENT DOCUMENTS 4-343310 11/1992 Japan.

*Primary Examiner*—Safet Metjahic
*Assistant Examiner*—John Chizmar
*Attorney, Agent, or Firm*—Oliff & Berridge

[57] ABSTRACT

A lens barrel for a camera includes a photography optical system, an ultrasonic motor, an external manual operation member and a conversion device. The ultrasonic motor includes a vibrating member that generates ultrasonic vibrations and a relative moving member connected with the vibrating member that moves the photography optical system along an optical axis through the ultrasonic vibrations. The external manual operation member is moved manually to move the photography optical system along the optical axis via the relative moving member. The conversion device reduces an amount by which the relative moving member moves in response to an amount by which the external manual operation member is moved. As a result, the external manual operation member can be used to adjust the photography optical system by minute amounts.

26 Claims, 4 Drawing Sheets

LENS BARREL WITH BUILT-IN ULTRASONIC MOTOR, CAMERA HAVING LENS BARREL AND METHOD

BACKGROUND OF THE INVENTION

1. Field of the Invention

The present invention relates to cameras and, in particular, to a lens barrel for a camera having a built-in ultrasonic motor that drives the shooting lens.

2. Background of Related Art

A lens barrel having a built-in ultrasonic motor in which a fixed member of the ultrasonic motor and a manual operation member are connected so that they rotate with respect to a fixed portion of the lens barrel, and in which the lens operating mode is selected by actuating an electrical switch, is known.

In such a lens barrel, when a manual focus adjustment mode is selected using a mode selection member, i.e., by actuating the electrical switch, a relative moving member and a fixed member of the ultrasonic motor become united and rotate as a single body in conjunction with the manual operation member (e.g., a manual operation ring that is rotated by a photographer) to drive a photography optical system. The fixed member of the ultrasonic motor vibrates to impart movement to other components of the lens barrel. When an automatic focus adjustment mode is selected, the fixed member does not rotate with respect to the fixed barrel, and the photography optical system is driven by rotation of the moving member alone.

Consequently, when the manual focus adjustment mode is selected, the photography optical system can be driven without damaging the surfaces of the fixed member and the relative moving member of the ultrasonic motor that contact each other.

FIG. 2 is a cross-sectional view that illustrates a conventional lens barrel 2 having a built-in ultrasonic motor (see, e.g., Japanese Unexamined Patent Publication Hei 4-343310). FIG. 3 is a cross-sectional view that illustrates how power is supplied to the components of the lens barrel. FIG. 4 is a schematic block diagram that illustrates a power supply circuit of the lens barrel of FIG. 2.

FIG. 2 illustrates the lens barrel 2 in the automatic focus adjustment state in which a focus adjustment optical system L2 and L3 is driven by the rotation of a ultrasonic motor Mo (FIG. 4), and a mode selection switch 20 is set to the automatic focus adjustment mode.

The focus adjustment optical system L2 and L3 is supported by the lens barrel 2 and conducts focus adjustment by moving in the direction of the optical axis. A socket of the lens barrel 2 is connected to an inner perimeter of a center intermediate diameter portion 1a of a fixed barrel 1. A pin 3 is disposed adjacent the outer perimeter of the lens barrel 2. The pin 3 protrudes through a guide groove provided in the center intermediate diameter portion 1a that is parallel with the optical axis. The tip of the pin 3 engages a cam groove 4a provided on the inner surface of a cam ring 4.

A pin 5 protrudes from the outer perimeter of the center intermediate diameter portion 1a to engage a circumferential groove 4b provided on the inner perimeter surface of the cam ring 4. Consequently, the cam ring 4 cannot move in the direction of the optical axis and thus can only rotate by a predetermined angle about the optical axis. The cam ring 4 also includes a distance scale that is displayed on the right side of the outer surface 4c of the large diameter portion of the cam ring 4.

A fixed member 6 of the ultrasonic motor Mo is connected with the outer perimeter of a center small diameter portion 1c of the fixed barrel 1 to rotate freely about the optical axis.

A window member 8, which is formed of a transparent synthetic resin, is disposed on a large diameter unit 1d of the fixed barrel 1. The window member 8 displays the distance scale on the outer perimeter 4c through an intermediate ring 7. The intermediate ring 7, which is preferably formed of transparent synthetic resin, freely rotates on the inner surface of a manual operation ring 10.

A rotating member 9 (i.e., the relative moving member of the ultrasonic motor Mo) is disposed to frictionally contact the fixed member 6 and to rotate freely about the optical axis on a bearing 12. In particular, an energizing member 14 causes the fixed member 6 and the rotating member 9 to contact each other via a round plate 13. The energizing member 14 is a forcing (or spring) member which gives a pressurizing force for forcing the rotating member 9 (a rotor) to the vibrating member 6 (a stator part of the ultrasonic wave motor). Pressuring the rotor to the stator is necessary for the ultrasonic wave motor. An engagement groove 9a is provided on the left side of the rotating member 9 to engage an engagement protrusion 4d on the right side of the inner perimeter of the large diameter portion of the cam ring 4. Consequently, the rotating member 9 and the cam ring 4 rotate together in the direction of rotation.

The manual operation ring 10 engages both the large diameter portion 1d of the fixed barrel 1 and the left side large diameter portion 1e, and thus, the manual operation ring 10 cannot move in the direction of the optical axis, yet it can rotate freely about the optical axis.

A glass epoxy plate 15 includes conductive portions 15a that extend around the entire circumference of the ring, as shown in FIG. 3. The glass epoxy plate 15 also includes through holes 15b at a position offset from the ring-shaped portion through which the conductive portions 15a form an electrical connection with the fixed member 6 at the rear surface of the glass epoxy plate 15. A brush 16 contacts the top surface of the conductive portions 15a, establishing an electrical connection with the fixed member 6 regardless of its angular position. Because the electrical connection between the glass epoxy plate 15 and the fixed member 6 is disposed on the opposite side of the conductive portions 15a, the electrical connection does not interfere with the operation of the brush 16.

A pressure plate 17 urges the brush 16 toward a fixed brush plate 18. The fixed brush plate 18 is attached to the fixed barrel 1 by a small screw 19.

The mode selection switch 20 slides in the direction of the arrow between the manual focus adjustment mode position M and the automatic adjustment mode position A. The mode selection switch is configured to generate an electrical signal in accordance with either mode when the switch is activated.

A switching plate 21 is attached to the mode selection switch 20 by a small screw 23. A plate spring 22 is attached to the fixed barrel 1 by a small screw 24. The plate spring 22 is disposed to cooperate with a plurality of engagement grooves 6a that are provided on the outer perimeter of the fixed member 6.

When the mode selection switch is slid to the M position, i.e., when the manual focus adjustment mode is selected, the switching plate 21 moves simultaneously, thereby pressing the plate spring 22 as indicated by the dotted line in FIG. 2. As a result, the plate spring 22 is withdrawn from the engagement grooves 6a. When the engagement grooves 6a of the fixed member 6 are separated from the plate spring 22, the manual operation ring 10 can be rotated.

When the mode selection switch 20 is slid to the A position, i.e., when the automatic focus adjustment mode is selected, the switching plate 21 is moved simultaneously, thereby allowing the plate spring 22 to return to its initial position as indicated by the solid line in FIG. 2. As a result, the plate spring 22 engages the engagement grooves 6a of the fixed member 6, and the manual operation ring 10 stops rotating.

The lens barrel is designed to satisfy a condition C<B<A, where A is a friction torque between the fixed member 6 and the rotating member 9, B is a friction torque between the fixed barrel 1 and the fixed member 6, and C is a torque necessary to drive the lens support barrel 2.

In operation, when the automatic focus adjustment mode is selected, the engagement grooves 6a of the fixed member 6 are engaged with the plate spring 22. Consequently, the manual operation ring 10 and the fixed member 6 stop rotating.

When a power source is connected to the ultrasonic motor Mo by a control mechanism (e.g., such as a power source unit 100 as shown in FIG. 4), ultrasonic waves are generated in the fixed member 6, and the rotating member 9 rotates in the circumferential direction. When the rotating member 9 rotates, the rotating member 9 and the cam ring 4 rotate together because the engagement groove 9a on the right side of the rotating member 9 engages the engagement protrusion 4d on the cam ring 4. When the cam ring 4 rotates, the lens barrel 2 moves along the optical axis so that automatic focus adjustment is conducted.

In the manual focus adjustment mode, the mode selection switch 20 is in the position M, and power is not supplied to the ultrasonic motor Mo. When the mode selection switch 20 is slid to the M position, the plate spring 22 is depressed and becomes separated from the engagement grooves 6a. When the engagement grooves 6a and the plate spring 22 are separated from each other, the manual operation ring 10 can rotate. Because power is not supplied to the ultrasonic motor Mo in this case, the ultrasonic motor Mo does not drive the lens barrel. As a result, the fixed member 6 and the rotating member 9 are firmly pressed together by the energizing member 14.

Because the friction torque A between the fixed member 6 and the rotating member 9 and the torque C necessary for driving the lens support barrel 2 satisfy the condition C<A, the fixed member 6 and the rotating member 9 rotate together with the intermediate ring 7 when the manual operation ring 10 rotates.

The rotating member 9 and the cam ring 4 rotate together because the engagement groove 9a on the left side of the rotating member 9 and the engagement protrusion 4d of the cam ring 4 are engaged. When the cam ring 4 rotates, the lens support barrel 2 is moved in the direction of the optical axis, and manual focus adjustment is conducted.

As described above, when the automatic focus adjustment mode is selected, the engagement grooves 6a are engaged with the plate spring 22, and the manual operation ring 10 and the fixed member 6 stop rotating.

The friction torque B between the fixed barrel 1 and the fixed member 6 and the torque C necessary for driving the lens support barrel 2 satisfy the condition C<B even when the engagement grooves 6a and the plate spring 22 are not engaged. However, when there is no engagement between the grooves 6a and the plate spring 22 only the rotating member 9 rotates (i.e., the fixed member 6 does not rotate). In other words, which focus adjustment mode has been selected can be ascertained by determining whether power is supplied to the ultrasonic motor Mo.

Accordingly, after a predetermined arbitrary photography distance is stored in memory and a photograph is taken of a subject at a different photography distance, manually actuating the mode selection switch may be unnecessary. Such manual switching is unnecessary if the camera includes, for example, a "go-home" photography function that drives the lens according to the photography distance stored in memory or a manual focus adjustment mode priority function that switches instantaneously to the manual focus adjustment mode by causing the manual operation ring to rotate during photography in the automatic focus adjustment mode. Consequently, automatically switching between the two focus adjustment modes while the camera is operating according to the functions described above can be implemented.

The output torque from the moving member and the number of rotations in the ultrasonic motor described above are determined primarily according to the size and shape of the motor. In other words, when the torque required to move the photography optical system is determined, the number of rotations is known. Accordingly, when the time necessary for the photography optical system to move from a photography distance of infinity to a close position is determined, the corresponding angle through which the moving body must rotate is also known.

With the conventional lens barrel described above, however, when the manual focus adjustment mode has been selected, the rotating member 9 (i.e., the relative moving member) and the fixed member of the ultrasonic motor move together. As a result, the photography optical system is driven by the rotation of these components in conjunction with the manual operation of the manual operation member. Consequently, the angle necessary for rotating the manual operation member from a photography distance of infinity to a close position is determined. A problem arises, however, when the angle is too small to allow manual focus adjustment.

SUMMARY OF THE INVENTION

An object of the present invention is to provide a lens barrel with a built-in ultrasonic motor in which manual focus adjustment of minute amounts is possible because the angle through which the manual operation member is rotated to change the focus from a photography distance of infinity to a close distance is larger than the angle through which the moving element of the ultrasonic motor rotates.

The lens barrel includes a photography optical system, an ultrasonic motor, an external manual operation member and a conversion device. The ultrasonic motor includes a vibrating member that generates ultrasonic vibrations and a relative moving member connected with the vibrating member that moves the photography optical system along an optical axis through the ultrasonic vibrations. The external manual operation member is moved manually to move the photography optical system along the optical axis via the relative moving member. The conversion device reduces an amount by which the relative moving member moves in response to an amount by which the external manual operation member is moved.

The lens barrel may include an engagement member that engages the external manual operation member and the vibrating member when the photography optical system is moved by the external manual operation member. The engagement member may include an intermediate ring connected with the external manual operation member and the vibrating member.

The relative moving member may be connected to the vibrating member by an energizing unit. The energizing unit may be connected to the vibrating member by a plate.

The conversion device may include a rotation member disposed to rotate in contact with the vibrating member and an energizing member that energizes the vibrating member through the rotation member. The rotation member may be a roller disposed to rotate on a shaft. The shaft may be disposed approximately parallel to and spaced from the optical axis. The conversion device may be configured to reduce the amount by which the relative moving member moves by approximately one half.

The external manual operation member may include a manual operation ring disposed to rotate about the optical axis to move the photography optical system along the optical axis.

With the present invention, manually adjusting the focus with precision is possible because the angle necessary for rotating the manual operation member from a photography distance of infinity to a close distance is larger than the angle through which the rotation member of the ultrasonic motor rotates.

BRIEF DESCRIPTION OF THE DRAWINGS

A complete understanding of the present invention may be obtained by reference to the accompanying drawings, when considered in conjunction with the subsequent detailed description thereof, in which.

DETAILED DESCRIPTION OF PREFERRED EMBODIMENTS

Figure 1:
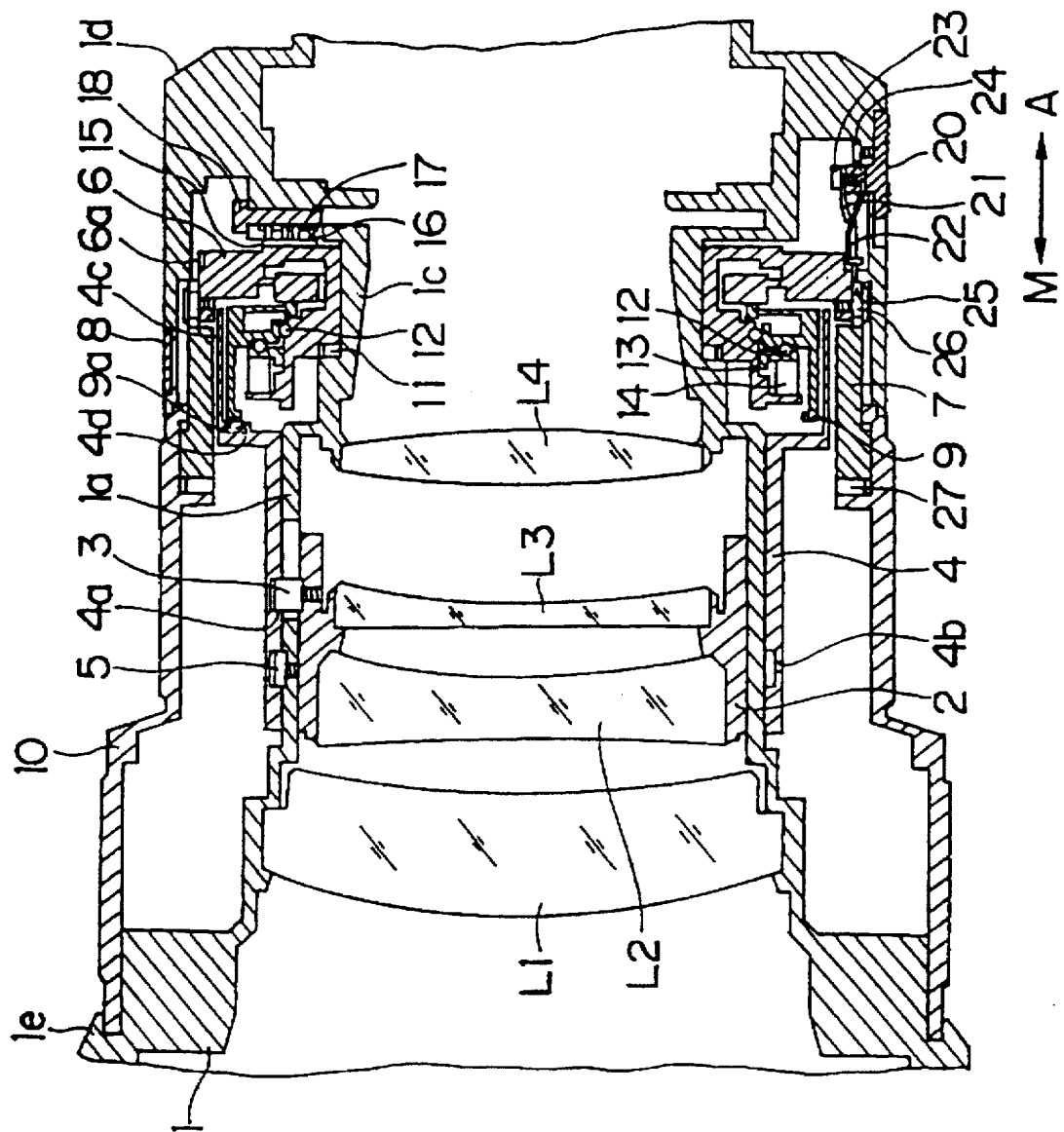
FIG. 1 is a cross-sectional view that illustrates an embodiment of the lens barrel with a built-in ultrasonic motor according to the present invention.
Figure 2:
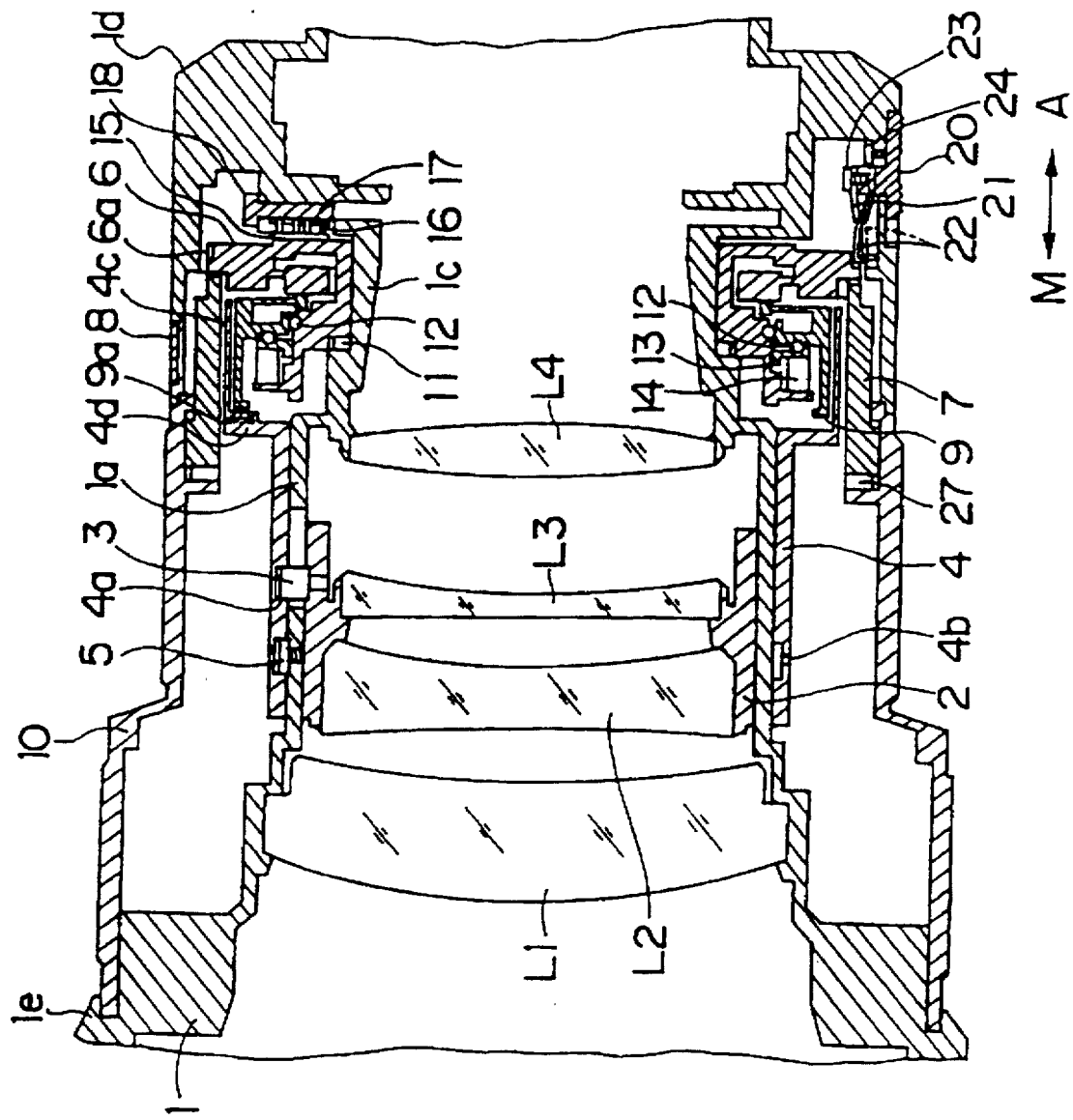
FIG. 2 is a cross-sectional view that illustrates a conventional lens barrel with a built-in ultrasonic motor.
Figure 3:
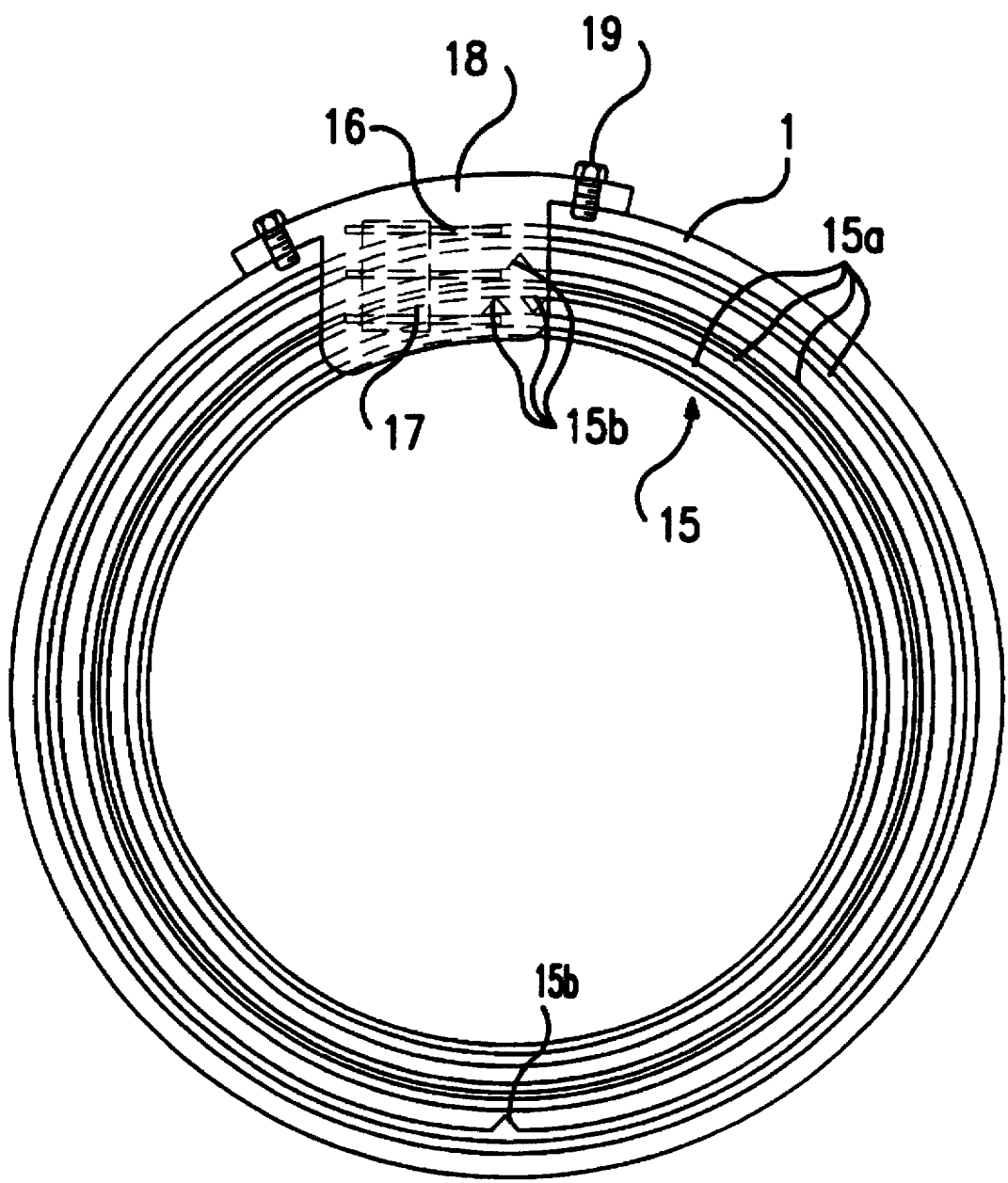
FIG. 3 is a cross-sectional side view that illustrates how power is supplied to the lens barrel.
Figure 4:
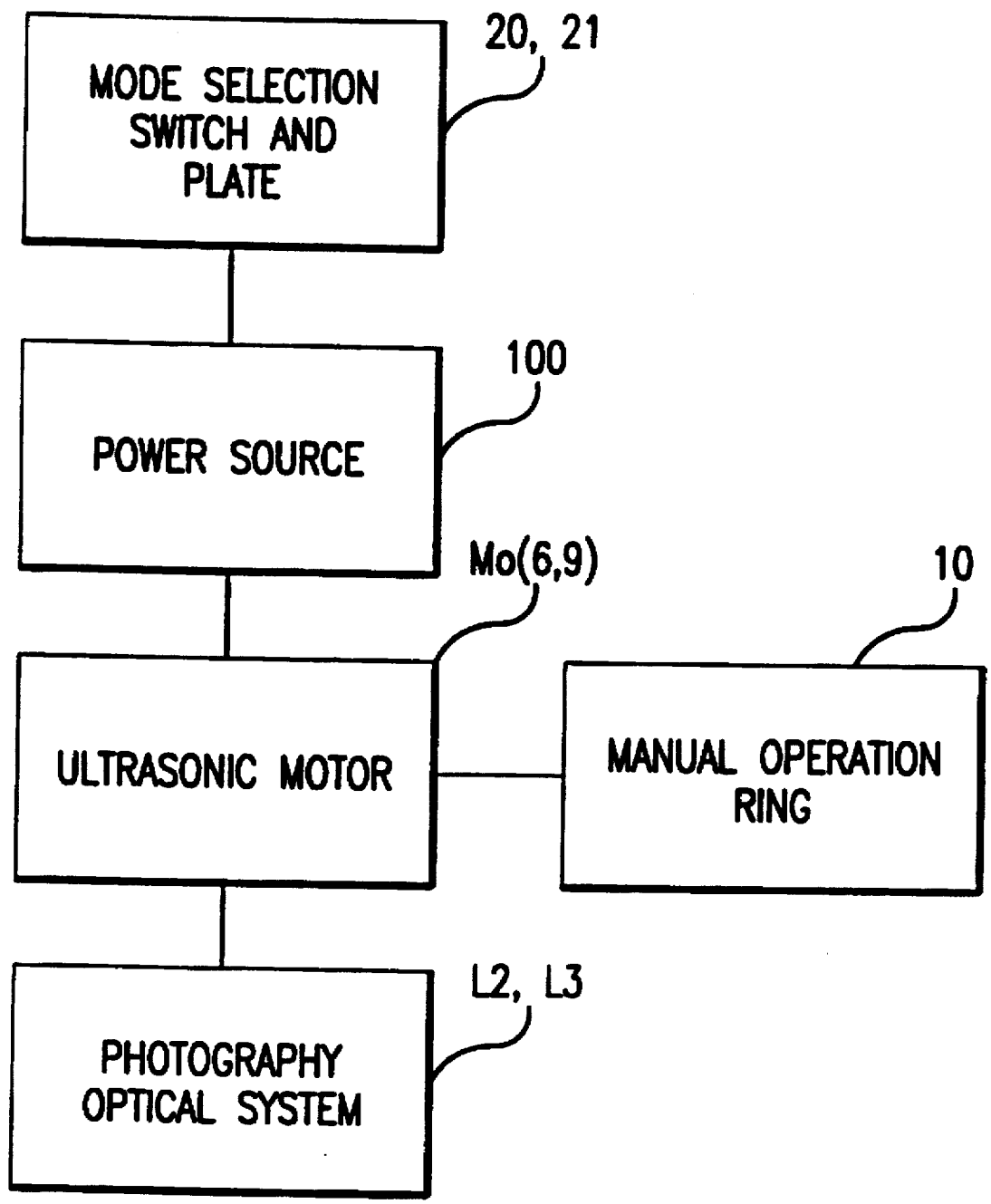
FIG. 4 is a schematic block diagram that illustrates the power supply of the conventional lens barrel.

One embodiment of the present invention is described below with reference to the drawings. FIG. 1 is a cross-sectional view that illustrates an embodiment of a lens barrel with a built-in ultrasonic motor according to the present invention. The elements of the lens barrel of the present invention that operate similar to the same elements of the conventional lens barrel described above are designated with the same reference symbols. An additional explanation of the commonly designated elements is omitted.

In this embodiment, a plurality of rollers 25 are fixed to the vibrating member 6 on at least 3 evenly spaced positions along the periphery by means of the rotation shafts 26. The internal rotation shafts 26 are preferably made of metal, and an outer covering of the rollers 25 is preferably made of rubber.

An energizing member 11 is disposed between the center small diameter portion 1c of the fixed barrel 1 and the vibrating member 6, and the vibrating member 6 is pressed against the roller 25 which are in turn pressed against the inner surface of the large diameter portion 1d of the fixed barrel 1. The energizing member 11 is a forcing (or spring) member in this embodiment, the energizing member 11 forces the vibrating member 6 towards the large diameter unit 1d. In this case, the surface receiving the force is the contacting surface between the rollers 25 and the large diameter unit 1d. As a result, a predetermined frictional torque is applied so that the vibrating member 6 does not rotate easily when the automatic focus adjustment mode is selected.

In addition, an energizing member 27 is disposed between the manual operation ring 10 and the intermediate ring 7. The force of energizing member 27 presses intermediate ring 7 against the rollers 25, which, are in turn, pressed against the inner perimeter of the large diameter unit 1d of the fixed barrel 1. The energizing member 27, which is also a forcing member, forces the intermediate ring 7 away from the manual operating member 10 to the right of FIG. 1) and generates friction with respect to the rollers 25. Moreover, frictional torque is generated between the manual operating member 10 and the intermediate ring 7. In this case, the surface receiving the force is the contacting surface between the rollers 25 and the large diameter unit 1d in the same manner as described above.

As a result, when the manual operating member 10 rotates, the manual operating member 10 and the intermediate ring 7 rotate together by the force from the energizing member 27. When the intermediate ring 7 rotates by the amount of θ in the clockwise direction, the vibrating member 6 is rotated by the amount θ/2. That is, while the rollers 25 auto rotate in a state in which they are positioned between the intermediate ring 7 and the large diameter unit 1d, they revalue by θ/2 because they are fixed together with the vibrating member 6.

Furthermore, after the cam ring 4 rotates through a predetermined angle and stops at a rotation limit, if the manual operation ring 10 is rotated further, the manual operation ring 10 and the intermediate ring 7 slip along their surfaces of contact with the energizing member 27 so that an excessive torque is not applied forward of the intermediate ring 7 (i.e, from the free end of the lens barrel). Accordingly, the internal components are not inadvertently damaged.

In an alterative embodiment, the rollers 25 may be fabricated of metal, synthetic resin or rubber, or a combination of two of these substances. In addition, small gears may be substituted for the rollers 25. Ring-shaped gears to engage with these small gears may be provided on the right side of the intermediate ring 7. In this case, these gears are energized by the energizing member 27.

In another alternative embodiment, the manual operation ring 10 and the intermediate ring 7 are formed as a single piece and are pressed by the energizing member 27, thereby slipping along the surface of contact with the rollers 25.

Furthermore, because frictional torque is supplied by the energizing member 27 through the intermediate ring 7 and rollers 25 as well as through the energizing member 11, the energizing member 11 can be eliminated by balancing the frictional torques applied by the other components.

With the lens barrel of the present invention, manually adjusting the focus of a camera by minute amounts is possible because the angle through which the manual operation member must be rotated to adjust from a photography distance of infinity to a close distance is larger than the angle of rotation of the rotating member of the ultrasonic motor.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. A lens barrel for a camera, comprising:
   a photography optical system;
   an ultrasonic motor having a vibrating member that generates ultrasonic vibrations and a relative moving member connected with said vibrating member that moves said photography optical system along an optical axis through the ultrasonic vibrations;
   an external manual operation member that moves said photography optical system along said optical axis via said relative moving member; and
   a conversion device that reduces an amount by which said relative moving member moves in response to an amount by which said external manual operation member is moved, said conversion device being operatively connected to said external manual operation member and said relative moving member.

2. The lens barrel of claim 1, further comprising an engagement member that engages said external manual operation member and said vibrating member when the photography optical system is moved by said external manual operation member.

3. The lens barrel of claim 2, wherein said engagement member includes an intermediate ring connected with said external manual operation member and said vibrating member.

4. The lens barrel of claim 1, wherein said relative moving member is connected to said vibrating member by an energizing unit.

5. The lens barrel of claim 4, wherein said energizing unit is connected to said vibrating member by a plate.

6. The lens barrel of claim 1, wherein said conversion device includes a rotation member disposed to rotate in contact with said vibrating member and an energizing member that energizes said vibrating member through said rotation member.

7. The lens barrel of claim 6, wherein said rotation member is a roller disposed to rotate on a shaft.

8. The lens barrel of claim 7, wherein said shaft is disposed approximately parallel to and spaced from said optical axis.

9. The lens barrel of claim 1, wherein said conversion device is configured to reduce said amount by which said relative moving member rotates by approximately one half.

10. The lens barrel of claim 1, wherein said external manual operation member includes a manual operation ring disposed to rotate about said optical axis to move said photography optical system along said optical axis.

11. An autofocus camera having a lens barrel, said camera being configured for photographing an object in at least a manual adjustment mode and an automatic focus adjustment mode, said lens barrel, comprising:
   a photography optical system;
   an ultrasonic motor having a vibrating member that generates ultrasonic vibrations and a relative moving member connected with said vibrating member that moves said photography optical system along an optical axis through the ultrasonic vibrations;
   an external manual operation member that is moved manually to move said photography optical system along said optical axis via said relative moving member; and
   a conversion device that reduces an amount by which said relative moving member moves in response to a amount by which said external manual operation member is moved, said conversion device being operatively connected to said external manual operation member and said relative moving member.

12. The autofocus camera of claim 11, further comprising an engagement member that engages said external manual operation member and said vibrating member when the photography optical system is moved by said external manual operation member.

13. The autofocus camera of claim 12, wherein said engagement member includes an intermediate ring connected with said external manual operation member and said vibrating member.

14. The autofocus camera of claim 11, wherein said relative moving member is connected to said fixed member by an energizing unit.

15. The autofocus camera of claim 14, wherein said energizing unit is connected to said fixed member by a plate.

16. The autofocus camera of claim 11, wherein said conversion device includes a rotation member disposed to rotate in contact with said vibrating member and an energizing member that energizes said vibrating member through said rotation member.

17. The autofocus camera of claim 16, wherein said rotation member is a roller disposed to rotate on a shaft.

18. The autofocus camera of claim 17, wherein said shaft is disposed approximately parallel to and spaced from said optical axis.

19. The autofocus camera of claim 11, wherein said conversion device is configured to reduce said amount by which said relative member moves by approximately one half.

20. The autofocus camera of claim 11, wherein said external manual operation member includes a manual operation ring disposed to rotate about said optical axis to move said photography optical system along said optical axis.

21. A method of focusing an autofocus camera having a lens barrel operable in at least a manual focus adjustment mode, said lens barrel having a photography optical system, an ultrasonic motor having a vibrating member and a relative moving member connected with said vibrating member and said photography optical system, an external manual operation member, and a conversion device operatively connected to said external manual operation member and said relative moving member, said method comprising:
   moving said external manual operation member to move said photography optical system along an optical axis; and
   reducing an amount by which said relative moving member moves in response to an amount by which said external manual operation member is moved with said conversion device.

22. The method of claim 21, further comprising moving said relative moving member by a reduced amount in response to said amount by which said external manual operation member is moved.

23. The method of claim 21, wherein said lens barrel includes an engagement member, and wherein said moving said external manual operation member step includes engaging said engagement member with said vibrating member.

24. The method of claim 21, wherein said conversion device includes a rotation member and an energizing member, and wherein said reducing step includes rotating said rotation member in contact with said vibrating member and energizing said vibrating member through said rotation member with said energizing member.

25. The method of claim 21, wherein said reducing step includes reducing said amount by which said relative moving member moves by approximately one half.

26. The method of claim 21, wherein said external manual operation member includes a manual operation ring, and wherein said step of moving said external manual operation member includes rotating said manual operation ring.

* * * * *